June 18, 1946.                B. F. WADDELL                2,402,354
                TEMPERATURE REGULATOR FOR ELECTRICAL APPLIANCES
                            Filed Sept. 2, 1939          3 Sheets-Sheet 1
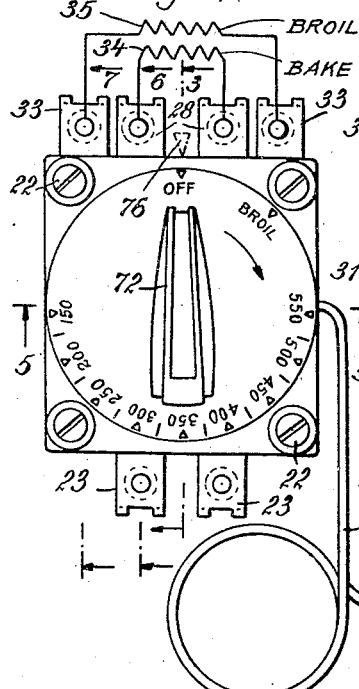
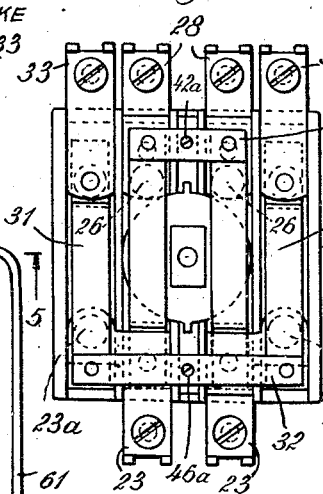
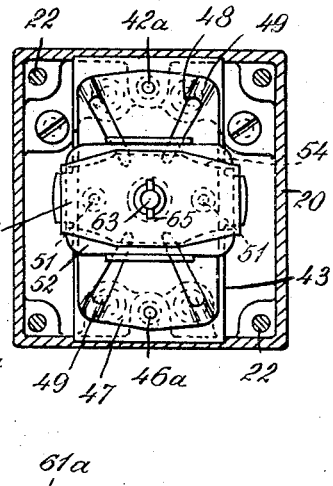
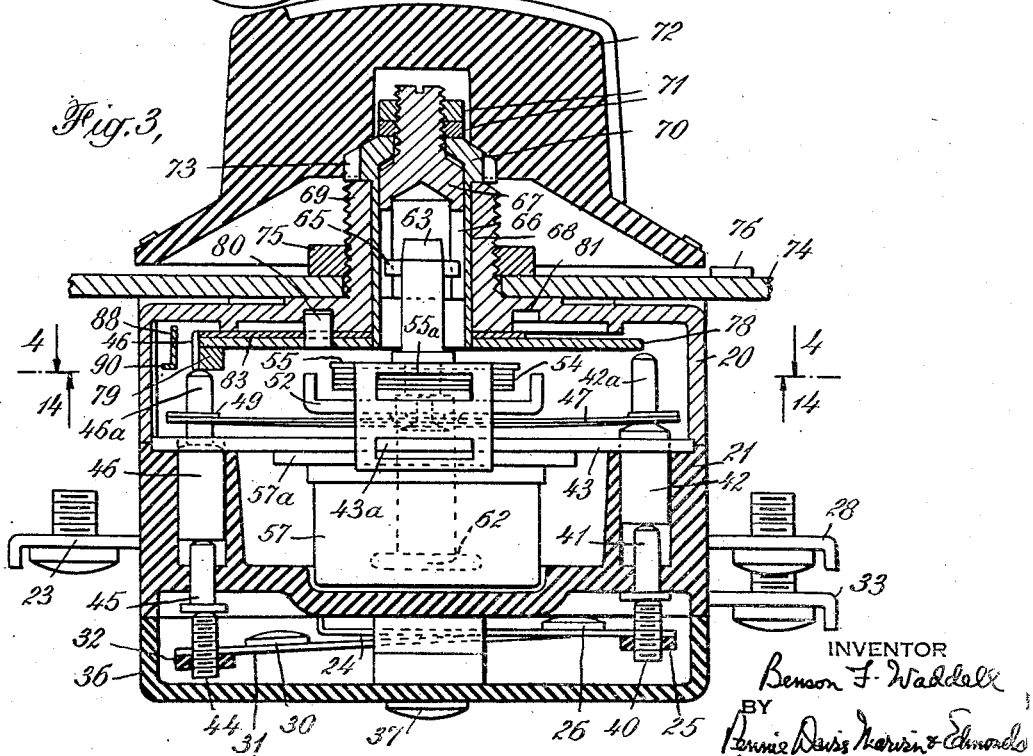
INVENTOR
Benson F. Waddell
BY
Pennie Davis Marvin & Edmonds
ATTORNEYS June 18, 1946.    B. F. WADDELL    2,402,354
TEMPERATURE REGULATOR FOR ELECTRICAL APPLIANCES
Filed Sept. 2, 1939    3 Sheets-Sheet 2
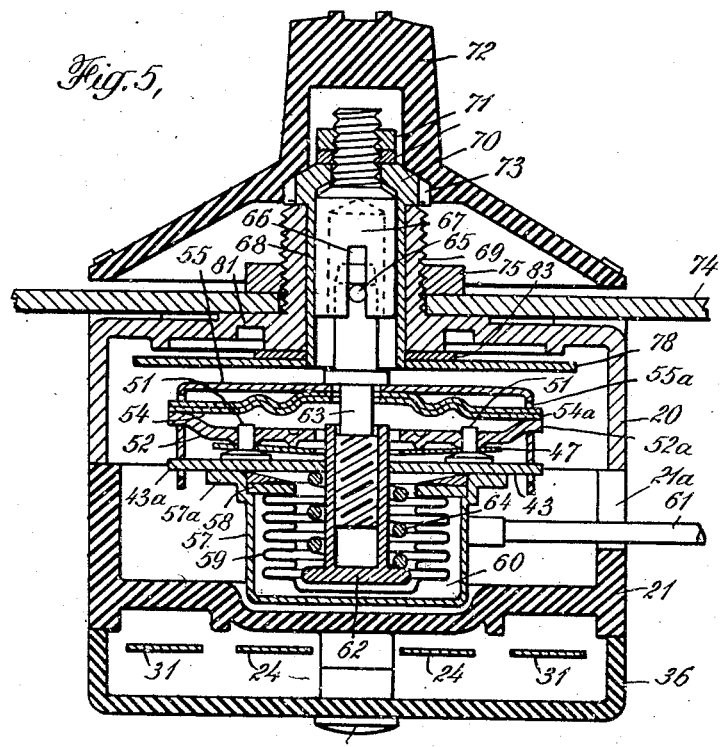
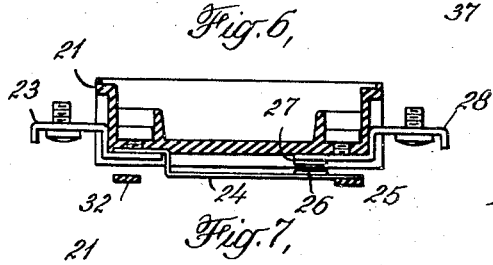
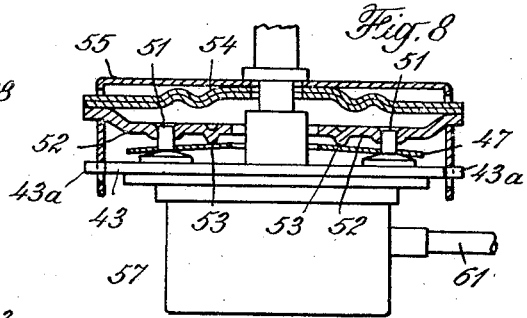
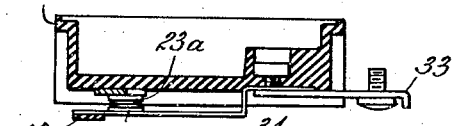
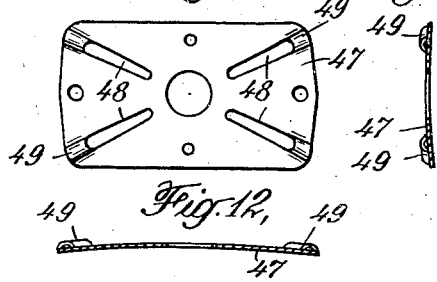
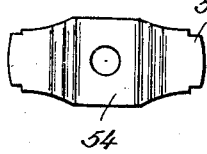
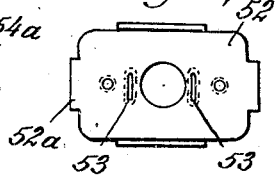
INVENTOR
Benson F. Waddell
BY
Pennie Davis Marvin & Edmonds
ATTORNEYS June 18, 1946.    B. F. WADDELL    2,402,354
TEMPERATURE REGULATOR FOR ELECTRICAL APPLIANCES
Filed Sept. 2, 1939    3 Sheets-Sheet 3
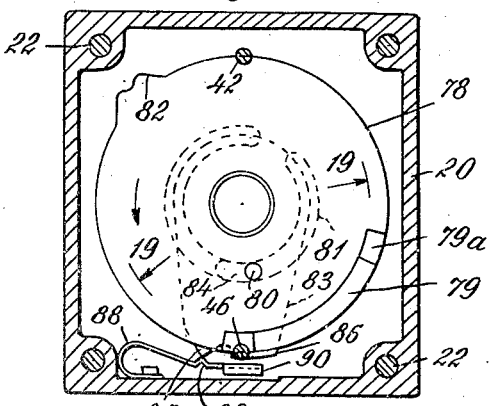
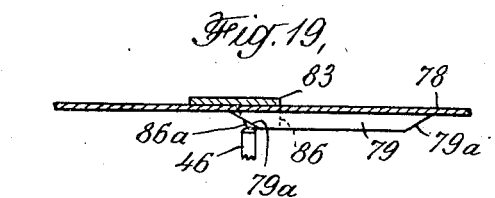
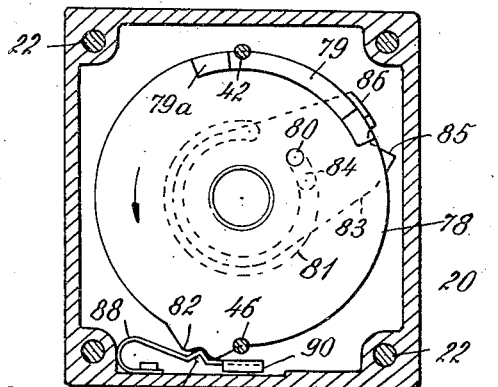
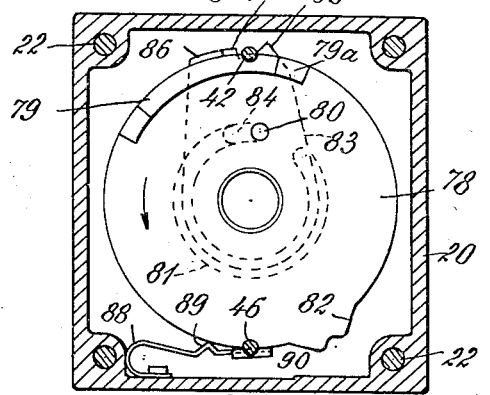
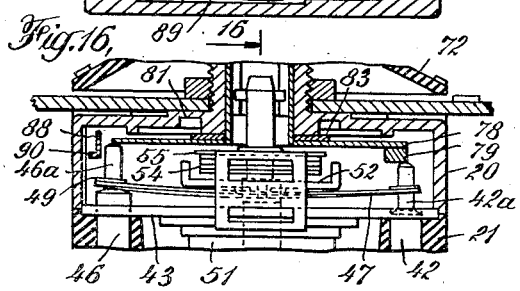
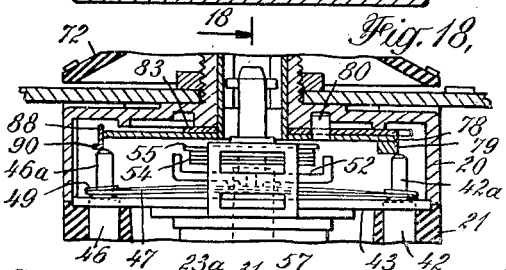
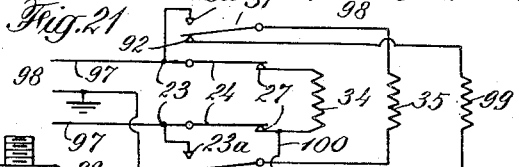
INVENTOR
Benson F. Waddell
BY
Pennie Davis Marvin & Edmonds
ATTORNEYS Patented June 18, 1946

2,402,354

UNITED STATES PATENT OFFICE 2,402,354

TEMPERATURE REGULATOR FOR ELECTRICAL APPLIANCES

Benson F. Waddell, Newark, N. J., assignor to The Wilcolator Company, Newark, N. J., a corporation of Delaware Application September 2, 1939, Serial No. 293,170

15 Claims. (Cl. 219—20)

This invention relates to regulators for controlling the temperature in electrical appliances, such as ovens, and the like, and has particular reference to a novel regulator for this use which is operable selectively by a temperature adjustment handle to place either of two independent heating circuits under automatic control of a thermostat to the exclusion of the other or to place both of the circuits under control of the thermostat during a preheating cycle after which one of the circuits is automatically rendered inoperative while the other remains under thermostatic control. The new regulator is of compact construction and is reliable in operation.

One feature of the invention resides in the provision of a novel temperature regulator including control means operable by rotation of a temperature adjustment handle from its off position to energize an oven baking element while maintaining a broiling element near the top of the oven inoperative and then, on further rotation of the handle to an intermediate temperature setting, to energize the broiling element along with the baking element during a preheating cycle, the control means being also operable automatically by a thermostat to control the baking element in accordance with the temperature setting of the handle and, if a preheating cycle is initiated, to maintain the broiling element inoperative after the preheating cycle. Preferably, the control means is also adapted to maintain the baking element inoperative and place the broiling element under control of the thermostat when the handle is rotated to a "broil" position, which may be at or near the end of its range of movement. Thus, with the new construction, the broiling element serves not only to heat the food by direct radiation from the top of the oven, but also to preheat the oven in conjunction with the baking element when the food is to be baked at or above the intermediate temperature. Accordingly, the oven may be heated to such a baking temperature more rapidly than in prior constructions wherein the broiling element is always de-energized when the baking element is operating.

Another feature of the invention resides in the provision of a temperature regulator for controlling two independent heating circuits, such as baking and broiling circuits, by a novel control mechanism including a snap element operable both manually and thermostatically to produce a snap action at its ends. In the preferred construction, the snap element is operated by a thermostat through a connection which is adjustable by a handle, and by rotating the handle from its off position the snap element is actuated manually to permit closing of the circuits, whereupon further rotation of the handle adjusts the connection to determine the temperature at which the thermostat returns the snap element to its initial, circuit opening position. The ends of the snap element may operate through independent connecting means to control contacts in the respective heating circuits, each connecting means preferably including a member movable relative to the snap element by a cam actuated by the handle, whereby either of the connecting means may be selectively removed from the influence of the snap element and its corresponding circuit maintained deenergized while the other connecting means controls its circuit in accordance with the movements of the snap element.

Still another feature of the invention is in the provision of a novel temperature regulator including a casing containing a unitary control mechanism which is operable both manually and thermostatically with a snap action to control two independent heating circuits and which is manually adjustable to different temperature settings. The control mechanism preferably includes a compensating element for counteracting ambient temperature changes and may be readily removed from or inserted in the casing as a unit.

These and other features of the invention may be better understood by reference to the following detailed description taken in conjunction with the accompanying drawings illustrating one form of the new regulator. In the drawings—

Fig. 1 is a plan view of a regulator made in accordance with the invention, showing diagrammatically a pair of independent heating elements connected thereto;

Fig. 2 is a bottom view of the regulator shown in Fig. 1 with the bottom cover removed;

Fig. 3 is an enlarged sectional view on the line 3—3 in Fig. 1;

Fig. 4 is a reduced sectional view on the line 4—4 in Fig. 3;

Fig. 5 is an enlarged sectional view on the line 5—5 in Fig. 1;

Figs. 6 and 7 are sectional views on the lines 6—6 and 7—7, respectively, in Fig. 1, with parts of the regulator removed;

Fig. 8 is a sectional view of part of the control means illustrated in Fig. 5, showing the snap element in a different position;

Fig. 9 is a detail view of a compensator forming part of the control mechanism;

Fig. 10 is a detail view of a pressure plate which engages the snap element;

Fig. 11 is a plan view of the snap element;

Figs. 12 and 13 are sectional views of the snap element;

Fig. 14 is a sectional view on the line 14—14 in Fig. 3, showing one position of the control mechanism;

Fig. 15 is a view similar to Fig. 14 showing the control mechanism in a different position;

Fig. 16 is a sectional view on the line 16—16 in Fig. 15, with parts of the regulator removed;

Fig. 17 is a view similar to Figs. 14 and 15 showing the control mechanism in a third position;

Fig. 18 is a sectional view on the line 18—18 in Fig. 17, with parts of the regulator removed;

Fig. 19 is a detail view of the cam of the control mechanism;

Fig. 20 is a sectional view of a modified form of the regulator with parts of the regulator removed;

Fig. 21 is a wiring diagram illustrating the use of the regulator shown in Fig. 20.

The new regulator, as shown, comprises a casing having an upper section 20 and a lower section 21 held together by screws 22. The lower section 21 is made of insulating material and carries a pair of terminal members 23 adapted for connection to the two sides of a current source (not shown). Each of the terminals 23 is secured to the bottom of section 21 over a movable contact arm 24, the two arms 24 being parallel and connected at their free ends by a cross piece 25 made of insulating material. A contact 26 near the free end of each arm 24 coacts with a fixed contact 27 on a terminal 28 projecting from the side of section 21 opposite the terminals 23. Each terminal 23 is formed with a lateral extension, as shown in Fig. 2, which carries a fixed contact 23a coacting with a movable contact 30 on a spring arm 31, the two arms 31 being disposed outside the arms 24 in parallel relation thereto and being connected by a cross piece 32 of insulating material. Each arm 31 is secured to the bottom of section 21 in contact with a terminal 33 adjacent one of the terminals 28. As shown in Fig. 1, the terminals 28 are connected to the opposite sides of a heating element 34, such as the baking element in an oven, while the terminals 33 are connected to the opposite sides of a second independent heating element 35, such as a broiling element.

The spring arms 24 and 31 tend to urge their respective contacts 26 and 30 into engagement with the fixed contacts 23a and 27, but the contacts are normally held disengaged against the spring action of the arms by a control means to be described presently, whereby the heating elements are normally de-energized. When the spring arms 24 are released, they engage the contacts 26 with contacts 27 and establish a circuit from the current source through one of the terminals 23, the arm 24 connected thereto, the corresponding contacts 26 and 27 and the respective terminal 28, the baking element 34, the other terminal 28, its corresponding contacts 27 and 26 to the other terminal 23 and the other side of the current source so as to energize the baking element. Likewise, when the spring arms 31 are released, they engage contacts 30 with contact 23a and establish a circuit which is traceable from one of the terminals 23 through its contact 23a, the contact 30 engaged therewith, the corresponding arm 31 and its terminal 33, the broiling element 35, the other terminal 33 and its arm 31, and the corresponding contacts 30 and 23a to the other terminal 23, whereby the broiling element is energized. A cover 36 made of insulating material may be secured to the bottom of the casing by a screw 37 to conceal and protect the contacts.

An adjustment screw 40 is threaded through cross arm 25 intermediate its ends and engages the head of an insulating pin 41 which extends upwardly through the bottom of section 21. Mounted on top of the pin 41 is a larger pin 42 which is slidable vertically and extends through an opening in a plate 43 held between the casing sections 20 and 21. Similarly, a second adjustment screw 44 is threaded through the cross arm 32 intermediate its ends and engages the head of an insulating pin 45 slidable vertically in the bottom of the casing and supporting a larger pin 46 which extends through an opening near the opposite end of the plate 43. Near their upper ends, the pins 42 and 46 are formed with shoulders adapted to engage the bottom of a snap element 47, and above the shoulders the pins are provided with reduced extensions 42a and 46a, respectively, which project through openings near the opposite ends of the snap element. The snap element, which may be made of sheet metal, is generally rectangular and provided with slots 48 radiating from the central portion thereof toward each corner, the metal between the ends of the slots and the respective corners being bent into a U-shape, as shown at 49 in Fig. 11. Thus, the effective perimeter of the snap element is reduced and it normally assumes a dished or concavo-convex form, as shown in Figs. 12 and 13.

The snap element is seated on the heads of upwardly projecting pins 51, the heads of the pins being secured to the top of plate 43 and the shanks of the pins projecting upwardly through openings in the snap element and through aligned openings in a pressure plate 52. The plate 52 is formed on its bottom surface with a pair of narrow detents 53 engaging the top surface of the snap element inwardly from the pins 51. Also, the pressure plate is provided with downwardly projecting bosses around the openings through which the pins 51 project. Supported on the ends of pressure plate 52 is a bimetallic compensator 54 which, as shown, is corrugated and is free to flex relative to the pressure plate. The plate 52 and the compensator are held in position by a U-shaped retaining strap 55, the legs of which extend downwardly and are formed with slots 55a through which lugs 52a and 54a on the pressure plate and compensator, respectively, project. The strap 55 is secured by lugs 43a which project from plate 43 through slots in the legs of the retainer near the lower ends thereof.

Within the housing section 21 is a cup-shaped member 57 formed at its open end with a flange 57a secured to the lower face of plate 43. Sealed to an annulus 58 in the cup-shaped member is a metallic bellows 59 which forms with the annulus and the cup-shaped member on expansible and contractible chamber 60. A capillary tube 61 leads from the chamber through a slot 21a in the casing to a bulb 61a which is adapted to be mounted in the oven and subjected to the heat of the baking and broiling elements 34 and 35. The bulb, the tube and the chamber 60 are filled with a thermo-responsive liquid, such as chlorinated diphenol.

The bottom of the bellows 59 is adapted to engage and displace the head of a pin 62 disposed in the bellows and projecting upwardly through a central opening in plate 43 and through aligned openings in the snap element and plate 52. The pin 62, as shown, is hollow and has a rod 63 threaded therein, the rod projecting upwardly through the end of the pin and through openings in compensator 54 and retainer 55. A shoulder on the rod is urged downwardly against the upper surface of the retainer 55 by a spring 64 coiled around pin 62 between the head thereof and plate 43.

Near its upper end, the rod 63 is provided with a pair of transverse lugs 65 received in slots 66 in a rotatable shaft 67. The shaft 67 is mounted within a sleeve 68 rotatable in an externally threaded boss 69 projecting from the top of the casing. The sleeve is formed with a head 70 seated on the end of boss 69 and through which a reduced extension of shaft 67 projects, and lock nuts 71 are screwed on the reduced end of the shaft to hold a shoulder on the shaft against the head of the sleeve, whereby the shaft and sleeve rotate together. A temperature adjustment handle 72 is mounted on the sleeve head 70 and is adapted to rotate the sleeve and the shaft through keys 73. The handle is removable from the sleeve head to permit loosening of the nuts 71 and relative adjustment of shaft 67 and sleeve 68, as will be described in detail presently. As shown in Fig. 1, the handle is provided on its face with indicia indicating an "off" position and a "broiling" position and with suitable temperature graduations. The regulator may be secured to a panel 74 of the range by a nut 75 threaded on the boss 69 which projects through the panel, and the latter may be provided with a fixed index 76 with reference to which the handle is adjusted.

Supported on and rotatable with the sleeve 68 is a cam plate 78 having an arcuate cam 79 on its lower face near the periphery of the plate. The cam 79 is formed with a gradual slope at its ends, as shown at 79a, and is adapted to engage the upper ends of the pins 42 and 46 and depress the pins on rotation of the handle 72. A pin 80 fixed to the cam plate projects upwardly into an arcuate groove 81 formed in the casing section 20 and serves to limit the rotation of the handle by engagement with the ends of the groove. Diametrically opposite the cam 79 is a finger 82 projecting radially from the cam plate and having a notch in its end.

Mounted loosely on the sleeve 68 between the cam plate 78 and the top of the casing is an arm 83 having an arcuate slot 84 therein through which the pin 80 projects, whereby rotation of the arm 83 relative to the cam plate is limited by engagement of pin 80 with the ends of the slot 84. At its end, the arm 83 is provided with a pointed finger 85 and with an ear 86 which is bent downwardly along the side of cam 79, one edge of the ear being beveled to form a cam surface 86a. The finger 85 is adapted to actuate a tumbler 88 secured to a side wall of the casing and having a sharp projection 89 engageable by the finger 85. At its free end the tumbler is provided with a stop 90 which normally overlies the top of pin 46 and maintains the pin in a depressed position. However, when the projection 89 of the tumbler is engaged by finger 85, the stop 90 is forced outwardly against the spring action of the tumbler and releases the pin 46.

The operation of the regulator is as follows: When the oven is at room temperature and the handle 72 is in its "off" position, the pin 62 is seated against the end of the bellows, and the snap element 47 assumes its normal, unflexed position, shown in Figs. 8 and 18, since the plate 52 exerts only a slight pressure on the snap element. The pins 42 and 46 are held in their depressed positions by cam 79 and stop 90, respectively, as illustrated in Figs. 17 and 18, so that the baking and broiling circuits cannot be energized by accidental operation of the snap element.

When the oven is to be used for baking at a relatively low temperature, the handle 72 is turned clockwise, as viewed in Fig. 1, so as to screw the rod 63 into the hollow pin 62. This results in an increase in the pressure of the rod against the retainer strap 55, and the increased pressure is transmitted through the compensator 54 to the pressure plate 52 which acts through detents 53 to force the snap element 47 to a flexed position of opposite curvature. During this rotation of the handle, the cam 79 is moved from its normal position over pin 42, and, accordingly, when the ends of the snap element flex upwardly under the action of the pressure plate, as shown in Fig. 3, the pin 42 rises under the action of spring arms 24 and engages its shoulder with the snap element, whereby the circuit through baking element 34 is closed. Thereafter, further rotation of the handle in a clockwise direction acts to move the pin 62 away from the end of the bellows an amount determined by the temperature for which the handle is set. Assuming that the handle is set for a baking temperature below a predetermined intermediate temperature, for example 370° F., the oven is gradually heated by the baking element and the fluid in the bulb 61a expanded so as to collapse the bellows 59 and cause the end thereof to reengage pin 62. Further expansion of the thermo-responsive fluid then causes the bellows to move the pin 62 upwardly against spring 64 and release the pressure of rod 63 on the retainer strap 55 and the pressure plate 52. When the oven is heated to the temperature for which the handle is set, the pressure of plate 52 on the snap element is released sufficiently to allow the latter to snap back to its normal position and depress the pin 42, whereby the baking circuit is deenergized.

As the oven cools, the thermo-responsive liquid in bulb 61a contracts and allows spring 64 to expand the bellows and move the pin 62 downwardly so as to increase the pressure on the strap 55 and plate 52 until the snap element moves to its flexed position and permits the pin 42 to move upwardly to its closed circuit position wherein the baking element is again energized. This action is repeated to maintain a substantially uniform temperature in the oven. It will be observed that during this action of the snap element, the locking member 90 remains in its operative position over the pin 46 so that the latter is held depressed to prevent energizing of the broiling circuit.

When the oven is to be used for baking at a relatively high temperature, for example, a temperature of 370° F. or more, a preheating cycle is initiated which heats the oven rapidly by the simultaneous operation of both heating elements. More particularly, in turning the handle clockwise, the friction between arm 83 and the top of the casing or the engagement of ear 86 with the tumbler projection 89 holds the arm 83 stationary until the pin 80 on the cam plate engages the end of slot 84 in the arm, as shown in Fig. 14. When the parts are in this position, the cam face 86a on ear 86 is in substantial alignment with the sloping face at the lagging end of cam 79 (Fig. 19). Continued clockwise rotation of the handle causes the ear 86, which still engages the tumbler projection 89, to move the stop 90 away from its position over pin 46, and the latter, therefore, is held in its depressed position only by the cam 79. When the tip of finger 85 meets the tip of the tumbler projection 89, as shown in Fig. 14, the pin 46 engages the cam face 86a which has a steeper incline than the adjacent sloping end of cam 79, so that the upward pressure of pin 46 against the cam face 86a moves the arm 83 rapidly in a clockwise direction, that is, counter-clockwise as viewed in Fig. 14, thereby forcing the tip of finger 85 beyond the tip of the tumbler projection 89. As a result, the pin 46 rises under the action of spring arms 31, and the stop 90 moves inwardly against the side of the pin, the inward movement of projection 89 serving to supplement the action of pin 46 and cam face 86a in shifting the arm 83 relative to cam plate 78. Thus, the broiling circuit is energized and supplements the action of the baking circuit in heating the oven to the relatively high temperature for which the dial is set.

When the oven is heated to the desired temperature, the pressure on snap element 47 is diminished by upward movement of rod 63 under the action of the bellows, so that the snap element returns to its initial position shown in Fig. 18 and depresses the pins 42 and 46, thereby deenergizing the heating elements. As soon as the pin 46 is depressed by the snap element, the stop 90 is urged inwardly by the tumbler to its initial position over the top of the pin, so that on cooling of the oven and subsequent movement of the snap element under pressure to its flexed position the baking circuit alone is energized and the broiling circuit remains inoperative. Thus, the pin 42 may be moved up and down in response to thermostatic flexing of the snap element so as to alternately energize and deenergize the baking element, but the pin 46 for the broiling circuit is held permanently by the stop 90 in its depressed, open circuit position out of the influence of the snap element.

When it is desired to use the oven for broiling, the handle 72 is rotated clockwise to the end of its range of movement where the index mark "Broil" is opposite the fixed index on the panel. As the handle moves into this position, the finger 82 on the cam plate engages the tumbler projection 89 and holds the stop 90 away from its normal position over pin 46, and the sloping surface 79a at the leading end of cam 79 rides onto the top of pin 42 and depresses the latter so as to open the baking circuit. As soon as the stop 90 is moved outwardly by finger 82, the pin 46 moves upwardly under the action of spring arms 31 so that the broiling element is energized. When the oven is heated to the broiling temperature, the snap element 47 moves back to its normal position and depresses the broiling pin 46, thereby deenergizing the broiling element, and when the oven cools sufficiently to cause the snap element to move back to its flexed position, the pin 46 is released and allows the broiling circuit to close again, this action continuing so as to maintain a substantially constant oven temperature. While the broiling is in progress, the cam 79 holds pin 42 in its depressed position so that the baking element cannot be energized.

When the oven is to be turned off, the handle 72 is rotated in a counter-clockwise direction, as seen in Fig. 1, and if the broiling pin 46 is in its elevated, open circuit position, the sloping end 79a of the cam 79 rides onto the top of the pin and depresses it, so that when the finger 85 and ear 86 have passed the tumbler projection 89, the stop 90 moves inwardly to its normal locking position over the top of pin 46. Then, as the handle moves to its "off" position, the sloping end of cam 79 rides onto the baking pin 42 and depresses the latter so as to open the baking circuit.

Due to the action of the broiling pin 46 on the cam face 86a, the parts are prevented from assuming a "dead" position in which both the baking circuit and the broiling circuit continue to operate under control of the snap element. Thus, the two heating elements are energized simultaneously only during a preheating cycle when the temperature adjustment handle is set for baking at or above an intermediate temperature, such as 370 deg. and as soon as the preheating cycle is completed and the snap element moves to its normal unflexed position, the stop 90 moves back into position over the broiling pin 46 to prevent further operation of the baking circuit. When the handle is set for a baking temperature below the intermediate temperature, the broiling element is maintained inoperative by the stop 90, but the cam 79 releases the baking pin 42 so that the shoulder of the latter moves into operative relation to the snap element. Conversely, when the handle is set for broiling, the baking pin 42 is held by cam 79 in its depressed, open circuit position so that it is no longer under control of the snap element, but the broiling pin 46 is released by the action of finger 82 on the tumbler 88, whereby the shoulder of pin 46 is held in operative relation to the snap element by spring arms 31.

The regulator may be calibrated by removing the handle 72, loosening the lock nuts 71 and rotating shaft 67 relative to the sleeve 68 so as to turn rod 63 and adjust the position of pin 62. Any changes in ambient temperature are counteracted by flexing of the compensator 54 relative to the pressure plate. That is, if the outside temperature should rise and heat the liquid in chamber 60 so as to collapse the bellows, the compensator 54 flexes and moves its ends downwardly to increase the pressure on plate 52, whereby the tendency for rod 63 to move upwardly on collapsing of the bellows is counteracted. Conversely, if the outside temperature decreases, the compensator 54 flexes in the opposite direction and tends to relieve the pressure on the plate 52. It will be apparent that movement of the pin 62 and rod 63 under the action of the bellows and the spring 64 is accommodated by a sliding movement of lugs 65 in the slots 66 of the temperature adjustment shaft.

The control mechanism of the regulator, including the bellows assembly, the snap element assembly and the adjustable connecting members 62 and 63, may be removed as a unit from the casing by detaching the casing section 20 from the section 21 and removing the plate 43. The pin and slot connection 65, 66 permit easy removal of the upper section 20 together with the handle, the adjustment shaft 67 and the cam plate 78. Accordingly, the regulator may be readily assembled or taken apart for repair.

The modified form of regulator shown in part in Fig. 20 is similar to that illustrated in Figs. 1 to 19, inclusive, except that an additional contact 92 is provided below each spring arm 31. Each contact 92 coacts with a contact 93 on the lower face of the corresponding arm 31 and is mounted on a spring arm 94 secured to the bottom cover 36 in engagement with a terminal 95. A screw 96 mounted on cover 36 below each arm 94 is adjustable to vary the position of the arm relative to the corresponding arm 31. This form of regulator is adapted for use in connection with a standard three wire circuit including two wires 97 having a potential of 220 volts between them and a third 110 volt neutral line 98 which is grounded, as shown in Fig. 21. The wires 97 are connected to the terminals 23, and the neutral wire 98 is connected through a resistor 99 to one of the terminals 92, the other terminal 92 being connected by a wire 100 to one side of the baking element 34.

The operation of the regulator is the same as that of the regulator shown in Figs. 1 to 19, inclusive, except that when the broil pin 46 and springs arms 31 are locked in their depressed positions by stop 90 and the baking switch 24—27 is closed to energize the baking element, the contacts 93 engage contacts 92 and establish a supplemental heating circuit traceable from neutral wire 98 through resistor 99, contact 92, arm 31, broiling element 35, the other arm 31 and its coacting contact 92, wire 100, and the bake switch 24—27 to one side 97 of the 220 volt line. This supplemental heating circuit serves to balance the heating of the oven by providing a small amount of heat from above during the baking period. Since the supplemental circuit is energized through the bake switch 24—27 it is under the direct control of that switch and operates only when the bake switch is closed and the double-throw broil switch 31 is depressed against contacts 92. It will be observed that when the broil switch 31—23a is closed, the broil element 35 is connected directly across the power line 97, as in the regulator shown in Figs. 1 to 19. Also, when the handle 72 is in its "off" position, the open bake switch 24—27 assures deenergizing of the broil element 35.

It will be understood that the baking element 34 and the broiling element 35 may be interchanged in the circuit shown in Fig. 21 and the resistor 99 replaced by a small heating coil near the top of the oven adjacent the broiling element. In this case, the small heating unit near the top of the oven is energized when the main baking element 34 is deenergized, thus reducing variations in the oven temperature.

In my new regulator, the operation is entirely automatic except for the manual adjustment of the handle to the desired temperature setting. In this connection, the preheating cycle is initiated automatically by the normal rotation of the handle from its "off" position or from a low temperature setting up to or above a predetermined intermediate setting at which the stop 90 for the broiling pin is released, and it is not necessary to perform a manual "cocking" operation, or the like, to release the broiling switch and start the preheating cycle.

I claim:

1. In an electrical switching mechanism, the combination of two switches for controlling two heaters, thermo-responsive mechanism for controlling the switches including an element responsive to temperature changes, a handle for adjusting said mechanism to different temperature settings, means operable on rotation of the handle from an off position to a predetermined intermediate temperature setting position to cause both switches to close, means responsive to opening of one switch upon thermostatic operation of said mechanism for locking the switch in its open position out of the influence of said mechanism while the other switch remains under control of the mechanism, and means operable on rotation of the handle beyond said intermediate temperature setting position to lock said last switch in its open position out of the influence of said mechanism while the first switch is under control of the mechanism.

2. In an electrical switching mechanism, the combination of two switches for controlling two heaters, an element responsive to temperature changes, mechanism operable by said element for controlling the switches, a handle for adjusting said element and said mechanism to different temperature settings, means operable on rotation of the handle from an off position to a predetermined intermediate temperature setting position to cause both switches to close, means responsive to subsequent thermostatic operation of said mechanism for locking one of the switches in its open position out of the influence of said mechanism while the other switch is under the control of the mechanism, and means operable on rotation of the handle beyond said predetermined intermediate temperature setting position to lock said last switch in its open position out of the influence of said mechanism while the first switch is under the control of the mechanism.

3. In an electrical switching mechanism, the combination of two switches for controlling two heaters, thermo-responsive mechanism for controlling the switches including an element responsive to temperature changes, a handle for adjusting said mechanism to different temperature settings, said mechanism being operable manually on rotation of the handle from an off position to a predetermined intermediate temperature setting position for closing both switches, means responsive to subsequent opening of one switch upon thermostatic operation of said mechanism for locking the switch in its open position out of the influence of said mechanism while the other switch remains under the control of the mechanism, and means operable on rotation of the handle beyond said predetermined intermediate temperature setting position to lock said last switch in its open position out of the influence of said mechanism while the first switch is under control of the mechanism.

4. In an electrical switching mechanism, the combination of two switches for controlling two heaters, an element responsive to temperature changes, mechanism operable by said last element for controlling the switches, a temperature adjustment handle for varying the response of the mechanism to operation of the thermo-responsive element and movable from an off position to a predetermined intermediate temperature setting position to cause both switches to close, locking means responsive to subsequent opening of the switches by said mechanism for rendering one of the switches inoperable by the mechanism, and means operable by movement of the handle to a predetermined position beyond said intermediate position for releasing said locking means and for rendering the other switch inoperable by said mechanism.

5. In an electrical switching mechanism, the combination of two switches, a snap element one end of which is operable to control one of the switches and the other end of which is operable to control the other switch, means responsive to temperature changes for actuating said snap element to move the ends thereof with a snap action, temperature adjustment means operable to vary the response of the snap element to operation of the thermo-responsive means and movable from an off position to actuate the snap element to cause the switches to close, and locking means responsive to subsequent thermostatic operation of the snap element for rendering one of the switches inoperable by said element.

6. In an electrical switching mechanism, the combination of two switches, a snap element one end of which is operable to control one of the switches and the other end of which is operable to control the other switch, means responsive to temperature changes for actuating said snap element to move the ends thereof with a snap action, a temperature adjustment handle for varying the response of the snap element to operation of the thermo-responsive means and movable from an off position to actuate the snap element, and means under control of the handle for selectively closing either of said switches while the other switch is under control of the snap element.

7. In an electric switching mechanism, the combination of two switches, a snap mechanism responsive to temperature changes, a handle for adjusting the mechanism to different temperature settings, independent connections between said snap mechanism and the respective switches for actuating the switches, each connection and the snap-acting mechanism being relatively movable into and out of operative relation with respect to each other, and means under control of the handle for selectively moving either of said connections and the snap mechanism relatively out of operative relation with respect to each other, said means being operable on movement of the handle from an off position to a predetermined intermediate temperature setting position to render both connections operable by the snap mechanism.

8. In an electrical switching mechanism, the combination of two switches, a snap element, an actuating pin for each switch having a shoulder engageable by the snap element and an extension projecting through the snap element, thermo-responsive means for actuating the snap element, a handle for adjusting said means to different temperature settings, cam means movable with the handle for selectively moving either of said pins to disengage its shoulder from the snap element, a locking member normally engaging the extension of one of said pins to hold its shoulder out of engagement with the snap element and means movable with the handle for rendering said locking member inoperative.

9. In an electrical switching mechanism, the combination of two switches, a supporting plate, a thermo-responsive element mounted on the plate, a pair of relatively adjustable members supported by the plate and movable by the thermo-responsive element, a snap element mounted on the plate and operable by the thermo-responsive element through said members, independent connecting means between the snap element and the respective switches, said connecting means being movable into and out of operative relation with the snap element, a handle for adjusting said members to different temperature settings, and cam means operable by the handle for selectively moving either of said connecting means out of operative relation with the snap element, said thermo-responsive element, snap element and adjustable members being removable as a unit.

10. In an electrical switching mechanism, the combination of two switches, an element responsive to temperature changes, mechanism operable by the element for controlling both switches, independent connecting members between said mechanism and the respective switches, each member being movable into and out of operative relation to the mechanism, a locking member normally engaging one of the connecting members to hold it out of operative relation to said mechanism and in position to hold open its corresponding switch, a temperature adjustment handle for adjusting said mechanism to different temperature settings and for varying the response of the mechanism to operation of the thermo-responsive element, means under control of the handle for moving the other connecting member into operative relation to said mechanism when the handle is moved from its off position, and means for releasing said locking member when the handle is moved farther to a predetermined intermediate temperature setting position.

11. In a control mechanism for a pair of independent switches, the combination of an actuating means for the switches, independent connecting members between said means and the respective switches and movable into and out of operative relation to said means, each member being biased toward its operative position relative to said means, a spring pressed tumbler normally engaging the end of one of said members to hold the same out of operative relation to the actuating means, a cam normally engaging one end of the other connecting member to hold the same out of operative relation to the actuating means, a handle movable from an off position to disengage the cam from said last member and thereby release the last member, means operable on rotation of the handle to an intermediate position for moving the tumbler away from the first connecting member to release said first member and then releasing the tumbler, whereby the tumbler moves into engagement with the side of said first member, and thermo-responsive mechanism adjustable to different temperature settings by the handle and operable through the actuating means to move said members to positions for opening the switches, whereby the tumbler returns into locking engagement with the end of the first member to hold the same out of operative relation to the actuating means.

12. In a control mechanism for a pair of independent switches, the combination of an actuating means for the switches, independent connecting members between said means and the respective switches and movable into and out of operative relation to said means, each member being biased toward its operative position relative to said means, a spring pressed tumbler normally engaging the end of one of said members to hold the same out of operative relation to the actuating means, a plate having a cam normally engaging one end of the other connecting member to hold the same out of operative relation to the actuating means, a handle movable from an off position to rotate the plate and disengage the cam from the second member, an arm movable relative to the plate and having a pin and slot connection therewith, the arm having a finger for moving the tumbler away from said first member to release the same and also having a cam face coacting with the first member to move the arm relative to the plate when the finger is opposite the tumbler, thereby releasing the tumbler and causing the tumbler to engage the side of the first member, and thermo-responsive mechanism adjustable to different temperature settings by the handle and operable through the actuating means to move said members to positions for opening the switches, whereby the tumbler returns into locking engagement with the end of the first member to hold the same out of operative relation to the actuating means.

13. In a control mechanism for a pair of independent switches, the combination of actuating means for the switches, a spring pressed tumbler normally locking one of the switches in its open position out of the influence of the actuating means, a cam for locking the other switch in its open position out of the influence of said means, a handle rotatable from an off position to move the cam from its locking position, a member movable with the handle and operable on rotation of the handle to an intermediate position to engage the tumbler and move the same out of its locking position, means for moving said member relative to the handle when the member is opposite the tumbler and for holding the tumbler out of its locking position, and thermo-responsive means adjustable by the handle to different temperature settings and operable through the actuating means to open the switches and release the tumbler.

14. In a control mechanism for a pair of independent switches, the combination of actuating means for the switches, means for locking one of the switches in its open position out of the influence of the actuating means, means for locking the other switch in its open position out of the influence of the actuating means, a handle rotatable from an off position to move said last locking means out of its locking position and maintain the same inoperative, a member movable with the handle and operable on rotation of the handle to an intermediate position to move said first locking means out of its locking position, thermo-responsive means adjustable by the handle to different temperature settings and operable through the actuating means to open the switches, and means responsive to opening of the switches for moving said first locking means back to its locking position while said second locking means is inoperative.

15. In a control mechanism for a pair of independent switches, the combination of actuating means for the switches, means for locking one of the switches in its open position out of the influence of the actuating means, means for locking the other switch in its open position out of the influence of the actuating means, a rotatable adjustment shaft, control means movable with the shaft and adjustable relative thereto, said control means being operable on rotation of the shaft from an off position to move said last locking means out of its locking position and on rotation of the shaft to an intermediate position to move said first locking means out of its locking position, thermo-responsive means adjustable by the shaft to different temperature settings and operable through the actuating means to open the switches, and means responsive to opening of the switches for moving said first locking means back to its locking position while said second locking means is inoperative.

BENSON F. WADDELL.